United States Patent [19]  
Kawamoto et al.

[11] Patent Number: 4,765,434
[45] Date of Patent: Aug. 23, 1988

[54] CONTROL APPARATUS FOR FOUR-WHEEL DRIVE VEHICLE WITH CENTER DIFFERENTIAL MECHANISM

[75] Inventors: Mutumi Kawamoto, Tokyo; Shuzo Moroto, Handa; Takashi Yamada; Shouji Yokoyama, both of Tokyo, all of Japan

[73] Assignees: Aisin-Warner Kabushiki Kaisha, Japan; Kabushiki Kaisha Shinsangyokaihatsu, Japan

[21] Appl. No.: 947,247

[22] Filed: Dec. 29, 1986

[30] Foreign Application Priority Data

Dec. 27, 1985 [JP] Japan ................... 60-294750
Feb. 13, 1986 [JP] Japan ................... 61-29388

[51] Int. Cl.⁴ .......................... B60K 17/352
[52] U.S. Cl. ................... 180/249; 73/862.33; 74/711
[58] Field of Search ............ 180/247, 248, 249, 250, 180/197; 74/705, 710, 710.5, 711; 73/862.33; 250/231 SE

[56] References Cited

U.S. PATENT DOCUMENTS 3,605,523  9/1971  O'Brien ............... 180/248 X
3,938,890  2/1976  Flavell ............. 73/862.33 X
4,135,391  1/1979  Dahle .
4,343,205  8/1982  Dzida ...................... 74/711
4,466,502  8/1984  Sakai ................. 180/248 X
4,484,654  11/1984  Hayakawa ........... 180/248 X
4,552,241  11/1985  Suzuki .
4,566,554  1/1986  Suzuki .................... 180/249
4,669,569  6/1987  Suzuki et al. ............. 180/249

FOREIGN PATENT DOCUMENTS

0076148  4/1983  European Pat. Off. ....... 180/248
215632  11/1984  German Democratic Rep. ............... 73/862.33
2001431  1/1979  United Kingdom ........... 73/862.33

Primary Examiner—John J. Love
Assistant Examiner—Charles R. Watts
Attorney, Agent, or Firm—Wegner & Bretschneider

[57] ABSTRACT

Disclosed is a control apparatus for a four-wheel drive vehicle having a center differential mechanism which allows a difference in rotating speed between front and rear wheels so as to absorb a difference in turning radius developed between the front and rear wheels when the vehicle is cornering, and a center differential clutch for limiting differential action of the center differential mechanism. The control apparatus has front-wheel torque sensor provided on a front-wheel drive shaft. When a negative torque is sensed on the front-wheel side while the vehicle is traveling with a restraint placed upon the differential action of the center differential mechanism, the restraint is reduced or removed automatically. This prevents occurrence of a tight corner braking phenomenon and permits the function of the center differential mechanism to fully manifest itself. The vehicle is kept in a stable and safe traveling condition in which driving force is fully utilized.

17 Claims, 8 Drawing Sheets

CONTROL APPARATUS FOR FOUR-WHEEL DRIVE VEHICLE WITH CENTER DIFFERENTIAL MECHANISM

BACKGROUND OF THE INVENTION

This invention relates to a control apparatus for a full-time four-wheel drive vehicle equipped with a center differential mechanism which permits a difference in rotating speed between the front and rear wheels caused by a difference in turning radius between the front and rear wheels produced when the vehicle is cornering.

The left and right wheels of an automotive vehicle generally have different turning radii at cornering. In order to compensate for the effects of this phenomenon and achieve cornering smoothly, a four-wheel drive vehicle is equipped with a differential mechanism (front and rear differentials) which absorbs the difference in rotating speeds between the left and right wheels in dependence upon the difference in turning radius. Since this phenomenon, namely the difference is turning radius, also develops between the front and rear wheels, it has been proposed to provide a four-wheel drive vehicle with a center differential mechanism which permits the difference in rotating speed between the front and rear wheels in dependence upon the difference in turning radius.

However, since the center differential mechanism functions to distribute front and rear wheel torque at an equal ratio, a limitation upon the transfer of driving force results in balance being achieved at either the front-wheel or rear-wheel driving force, whichever has the lower value. Consequently, there are situations where a four-wheel drive vehicle with a center differential mechanism exhibits a deterioration in transmitted driving force, as when there is a low coefficient of friction between the road surface and tires, in comparison with a four-wheel drive vehicle without a center differential mechanism. This can cause a phonomenon such as slipping (racing) of the front or rear wheels due to an inability to transfer the driving force to the road surface sufficiently, as when a large driving force is produced at acceleration.

In order to prevent these detrimental effects, a center differential locking mechanism is provided for a direct transfer of power between the front and rear wheels without the intervention of the center differential. When a large driving force becomes necessary, as during acceleration or when driving on a poor road surface, the center differential is locked manually. Under ordinary driving conditions when a large driving force is not required, the center differential is manually unlocked.

If the vehicle is traveling with the center differential mechanism locked, however, at cornering the front wheels must rotate faster than the rear wheels when the turning radius is small. Since the center differential mechanism is locked, however, the rotating speed differential between the front and rear wheels cannot be absorbed. As a result, a negative torque develops on the front-wheel side and it is just as if braking were being applied solely to the front wheels. In other words, a problem referred to as the "tight corner braking" phenomenon occurs. In this phenomenon, centrifugal force caused by the turn increases as the vehicle speed increases and the tires skid in the centrifugal direction. In consequence, the difference in rotating speed between the front and rear wheels is absorbed by the skidding of the tires. This has a deleterious influence upon the stability of the traveling vehicle during cornering. Manually unlocking the center differential mechanism is not a solution because this will not allow the condition of the road surface to be judged accurately and dealt with promptly.

Thus, if the center differential mechanism is locked during vehicle travel, the tight corner braking phenomenon occurs. In order to prevent this with assurance, it is necessary to monitor front wheel torque constantly and unlock the center differential mechanism automatically if, say, the front wheels develop a negative torque. This makes it necessary to measure the torque of the driven wheels. One method of measuring the torque of a driven wheel is to measure the angle of torsion of the drive shaft.

Rotary encoders have been proposed for the purpose of measuring a turning angle such as the torsional angle of a shaft. These encoders are of two types, namely an absolute-type and incremental type.

Figure 9:
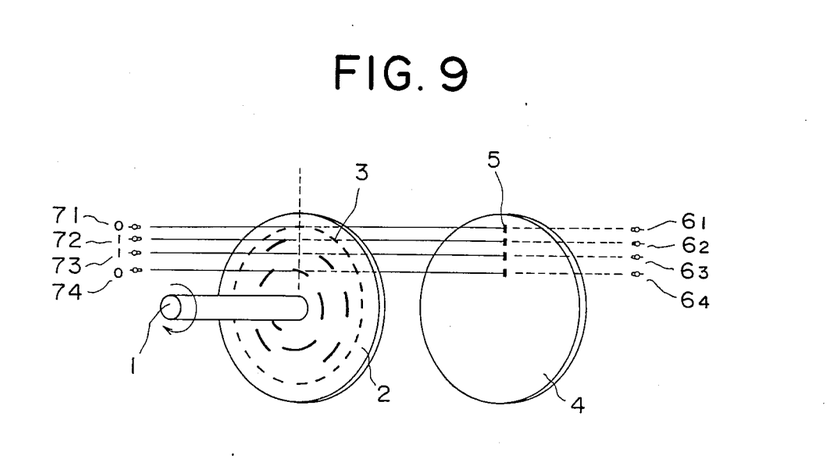
FIGS. 9 and 10 are perspective views illustrating examples of rotary encoders according to the prior art.

FIG. 9 illustrates a rotary encoder of the absolute type. The encoder includes a rotary shaft 1, a slitted disk 2 mounted on the rotary shaft 1, and a slitted disk 4 opposing the slitted disk 2. The disk 2 is provided with slits 3 in a plurality of concentric rows arranged from the circumference to the center of the disk, and the disk 4 is provided with slits 5 corresponding to each row of the slits 3. Light-emitting elements $6_1$–$6_4$ and light-receiving elements $7_1$–$7_4$ are arranged to oppose each other at positions corresponding to the rows of slits, with the disks 2, 4 being interposed therebetween.

Let "1" represent a state in which a light-receiving element is receiving light, and let "0" represent a state in which a light-receiving element is not receiving light. When the disk 2 rotates owing to rotation of the rotary shaft 1, the turning angle can be detected as a digital quantity from the combination of "0", "1" outputs from the light-receiving elements, this depending upon which of the light-receiving elements $7_1$–$7_4$ receive light.

Figure 10:
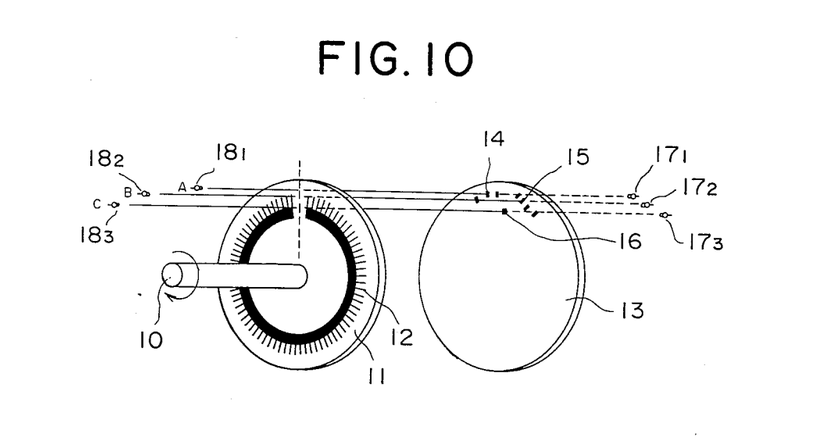

FIG. 10 illustrates a rotary encoder of the incremental type. The encoder includes a rotary shaft 10, a slitted disk 11 mounted on the rotary shaft 10, and a slitted disk 13 opposing the slitted disk 11. The disk 11 is provided with slits 12 arranged in a single circumferentially extending row. The disk 13 is provided with slits 14, 15 staggered by one-fourth pitch with respect to the slits 12, and a slit 16 for producing a zero signal. Light-emitting elements $17_1$, $17_2$ and light-receiving elements $18_1$, $18_2$ are arranged to oppose each other with the disks 11, 13 interposed therebetween, and a light-emitting element $17_3$ and light-receiving element $18_3$, which are for producing the zero signal in cooperation with the slit 16, are arranged to oppose each other at positions corresponding to the slit 16, with the disks 11, 13 being interposed therebetween.

Whenever the disk 11 in the arrangement of FIG. 10 rotates by one pitch, namely through the angular spacing between neighboring ones of the slits 12, the light-receiving elements $18_1$, $18_2$ each produce an output pulse. The angle through which the disk 11 turns can be determined by counting these output pulses. Further, since the outputs of the light-receiving elements $18_1$, $18_2$ are out of phase by one-fourth cycle, the direction in which the disk 11 turns can be discriminated be detecting which output is leading or lagging in terms of phase.

However, the conventional rotary encoders of the types described above have slits which are very fine and complicated in shape, precision cannot be readily improved and costs are high owing to difficulties encountered in production techniques.

SUMMARY OF THE INVENTION

The present invention has been devised in order to solve the aformentioned problems.

Specifically, an object of the present invention is to prevent tight corner braking from occurring by automatically unlocking the center differential mechanism upon sensing a negative torque produced on the front-wheel side of an automotive vehicle.

Another object of the present invention is to effectively utilize the driving force in a four-wheel drive vehicle by allowing the function of a center differential mechanism to fully manifest itself through a simple arrangement.

A further object of the present invention is to measure the torque acting on a drive shaft of an automotive vehicle which can be readily manufactured and improved in precision and in which the output characteristic can be varied with ease.

According to the present invention, the foregoing objects are attained by providing a control apparatus for a four-wheel drive vehicle having a center differential mechanism which allows a difference in rotating speed between front and rear wheels so as to absorb a difference in turning radius developed between the front and rear wheels when the vehicle is cornering, and a center differential clutch for limiting differential action of the center differential mechanism. The control apparatus includes front-wheel torque sensing means provided on a front-wheel drive shaft for sensing the front wheel torque, and means for automatically actuating the center differential clutch, thereby reducing or removing the restraint on the differential action of the center differential mechanism, in a case where the front-wheel torque sensing means senses that a negative front wheel torque is generated while the vehicle is traveling with the differential action of the center differential mechanism restrained.

In the control apparatus of the invention having the above construction, the restraint on the center differential mechanism is reduced automatically when a negative torque is sensed on the front-wheel side. This prevents occurrence of a tight corner braking phenomenon and permits the function of the center differential mechanism to fully manifest itself. The vehicle is kept in a stable and safe traveling condition in which driving force is fully utilized. The overal structure is simplified since only a single torque sensor is provided on the front-wheel drive shaft.

According to the invention, first and second opposing disks are mounted on a shaft and each disk has a continous slit. The slits appear to intersect each other when viewed along the common central axis of the disks. Opposing rows of plural light-emitting elements and light-receiving elements extending from the circumferences to the centers of the disks are provided with the first and second disks interposed therebetween. Accordingly, only a single point of light at the point of intersection of the two slits and corresponding to the relative turning angle of the two disks is capable of being received by the light-receiving elements. The relative turning angle of the two disks can be determined from the position of this point, thereby making it possible to measure the torsion angle of the shaft. Since the slits are of simple shape, the disks can be readily fabricated. Precision can be improved by changing the angle at which the two slits intersect each other. In addition, the range of angular measurement and the output characteristic can be changed with ease by altering the shape and length of the slits. The apparatus can be disposed in the transfer of a four-wheel drive vehicle to accurately measure the torsion angle of a wheel drive shaft, namely the torque acting on the drive shaft.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION

Figure 1A:
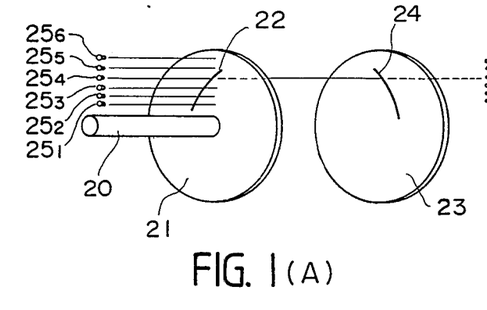
FIG. 1 illustrates an embodiment of a turning angle measurement apparatus applied to the present invention, in which (A) is a perspective view and (B) a view seen from a rotary shaft.
Figure 1B:
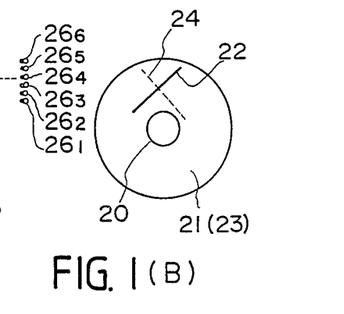

FIG. 1 illustrates an embodiment of a turning angle measurement apparatus according to the present invention, in which (A) is a perspective view and (B) a view seen from a rotary shaft. The apparatus includes a rotary shaft 20, a slitted disk 21 mounted on the rotary shaft 20, and a slitted disk 23 opposing the slitted disk 21. The disk 21 is provided with a single slit 22 extending continuously from a location near the center of the disk toward the circumference of the disk. The disk 23 is provided with a single slit 24 extending continuously from a location near the center of the disk toward the circumference thereof so as to intersect the slit 22 when viewed along the rotary shaft 20. Light-emitting elements $25_1$–$25_6$ are arranged to oppose respective ones of light-receiving elements $26_1$–$26_6$ with the disks 21, 23 interposed therebetween.

As shown in FIG. 1(B), the slits 22, 24 intersect at a point C, which changes in dependence upon the relative turning angle between the disks 21, 23. When the point C crosses the opposing rows of light-emitting and light-receiving elements, a light-receiving element at a position corresponding to the point C, e.g. the light-receiving element $26_3$, receives light from the light-emitting element $25_3$. Since the light-receiving position corresponds to the relative turning angle between the two disks 21, 23, the turning angle can be measured based on which of the light-receiving elements is receiving light.

Figure 2:
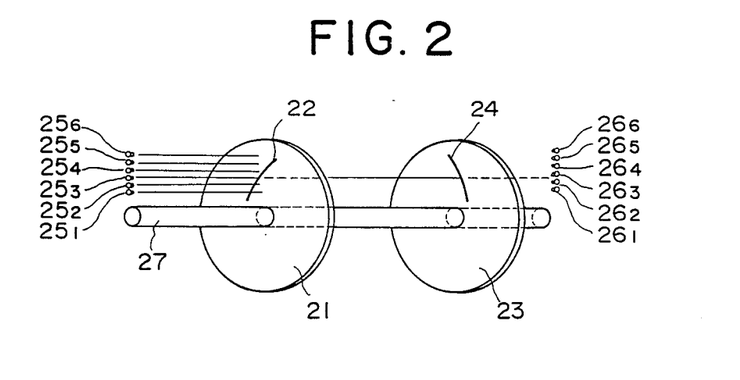
FIG. 2 is a perspective view illustrating an embodiment in which the turning angle measurement apparatus of FIG. 1 is applied to measurement of shaft torsion angle.

FIG. 2 illustrates an embodiment in which the turning angle measurement apparatus of FIG. 1 is applied to shaft torsion angle measurement. Portions similar to those of FIG. 1 are designated by like reference numerals.

In the apparatus of FIG. 2, the disks 21, 22 are mounted on the same shaft 27. When the disks 21, 23 rotate relative to each other due to twisting of the shaft 27, the point at which the slits 22, 24 intersect moves in accordance with this relative rotation and the torsion angle of the shaft 27 can be measured on the basis of outputs from the light-receiving elements at the positions occupied by the moving point of intersection.

In the embodiments of FIGS. 1 and 2, an output signal is obtained when the intersection of the slits crosses the opposing rows of light-emitting and light-receiving elements. However, if the light-emitting and light-receiving elements are provided so as to be fixed with respect to the respective slits 22, 24, and output signal indicative of the relative turning angle will be obtained at all times.

Figure 3:
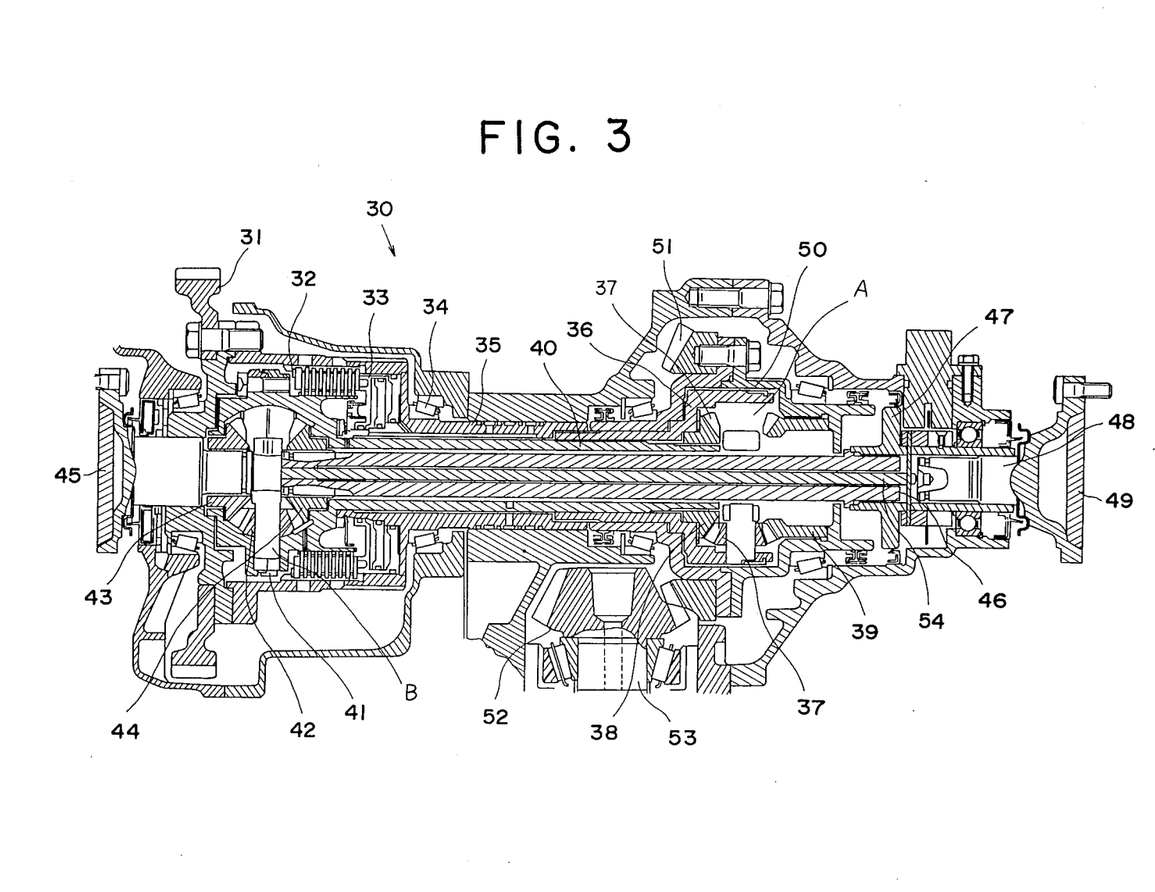
FIG. 3 is a sectional view showing a transfer system of a four-wheel drive vehicle with a center differential having a torsion angle measurement apparatus according to the invention mounted thereon.
Figure 4:
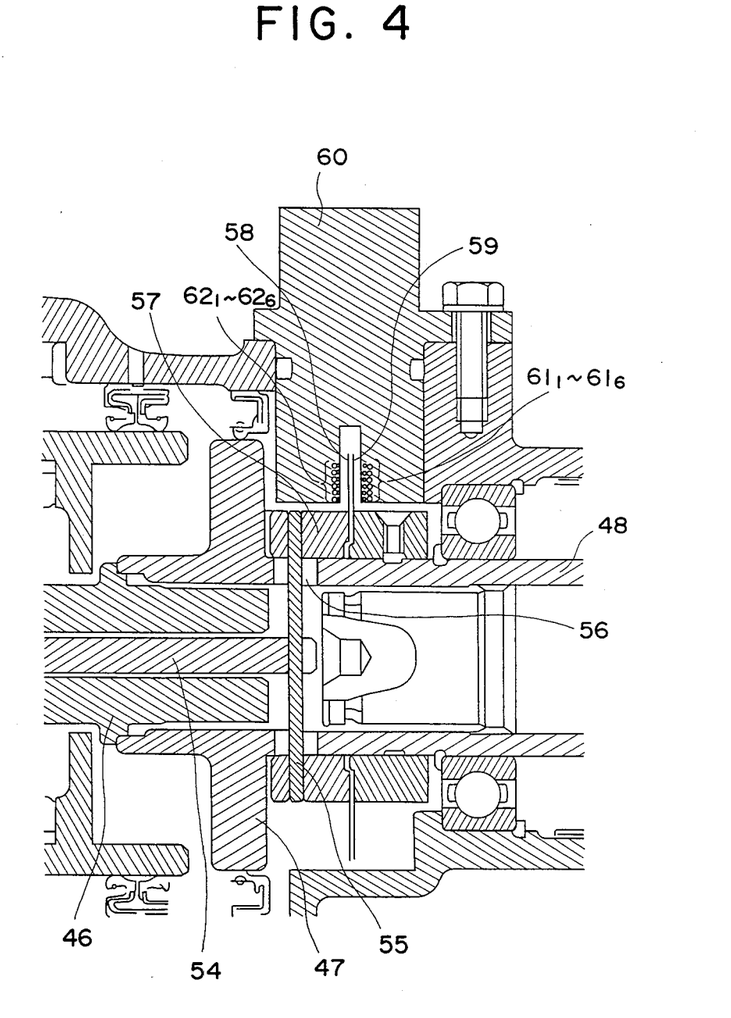
FIG. 4 is an enlarged sectional view of a portion of the torsion angle measurement apparatus shown in FIG. 3.

FIG. 3 is a sectional view showing a transfer system of a four-wheel drive vehicle with a center differential having a torsion angle measurement apparatus according to the invention mounted thereon, and FIG. 4 is an enlarged sectional view of a portion of the torsion angle measurement apparatus shown in FIG. 3. Numeral 30 denotes a transfer, A a center differential mechanism, B a front differential mechanism, 31 a ring gear, 32 a front differential case, 33 a clutch for the center differential, 34 a conical roller bearing, 35 a first hollow shaft, 36 a differential carrier, 37 a differential pinion, 38, 39 side gears, 40 a second hollow shaft, 41 a differential carrier, 43 a differential pinion, 43, 44 side gears, 45 a left front-wheel drive shaft, 46 a third hollow shaft, 47 a fourth hollow shaft, 48 a shaft, 49 a left front-wheel drive shaft, 50 a center differential case, 51 a ring gear for rear-wheel drive, 52 a gear, 53 a drive pinion shaft, 54 a slender rod, 55 a rod provided at the distal end of the rod, 56 a window provided in the fourth hollow shaft, 57 a cylinder body, 58 a slitted disk provided in the cylinder body, 59 a slitted disk fixedly secured to the fourth hollow shaft 47, 60 a turning angle pick-up mechanism, $61_1$–$61_6$ light-emitting elements, and $62_1$–$62_6$ light-receiving elements.

Generally speaking, when the engine is installed in the front of a four-wheel drive vehicle equipped with a center differential, the transfer mechanism is of the type shown in FIG. 3. Specifically, rotation of the engine is subjected to a suitable speed change via an automatic transmission mechanism (not shown) and is transmitted to the front differential case 32 through the ring gear 31 disposed in the transfer 30. When the vehicle is traveling in an ordinary manner, the clutch 33 for the center differential is in the disengaged state. Under these conditions, rotation of the front differential case 32 is transmitted to the differential carrier 36 of the center differential mechanism A through the first hollow shaft 35, and then is transmitted from the differential pinion 37 to the left and right side gears 38, 39. The rotation of the left side gear 38 is transmitted to the differential carrier 41 of the front differential mechanism B through the second hollow shaft 40, and then from the differential pinion 42 to the left and right side gears 43, 44.

Rotation of the left side gear 43 is transmitted to the left front-wheel drive shaft 45 from the left side gear 43, and rotation of the right side gear 44 is transmitted to the right front-wheel drive shaft 49 via the third hollow shaft 46, the fourth hollow shaft 47 splined to the shaft 46, and the shaft 48 splined to the fourth hollow shaft 47. Rotation of the right side gear 39 is transmitted to the center differential case 50 splined to the gear 39, and then to the drive pinion shaft 53 via the rear wheel-drive ring gear 51 and gear 52. The rotation is then transmitted to the left and right front-wheel drive shafts via a propeller shaft and rear differential unit, which are not shown.

If a large driving force is required as when traveling on a snow-covered or sandy road, or if it is feared that the wheels of the vehicle may slip, the clutch 33 for the center differential is engaged to lock the center differential mechanism A. When this is done, the rotation of the front differential case 32 is transmitted directly to the differential carrier 41 of the front differential mechanism B via the clutch 33 for the center differential. The rotation is then transmitted from the differential pinion 42 to the left and right side gears 43, 44 and thence to the left and right front-wheel drive shafts 45, 49, respectively. At the same time, the differential carrier 36 and left side gear 38 of the center differential unit A rotating in unison with the front differential case 32 and differential carrier 41 via the hollow shafts 35, 40, respectively, corotate without differential motion. This rotation is transmitted to the center differential case 50. As a result, rotation at a speed identical with that of the differential carrier 41 for front-wheel drive is transmitted to the ring gear 51 for rear-wheel drive, thereby driving the left and right rear-wheel drive shafts.

An arrangement can be adopted in which the clutch 33 for the center differential is capable of being placed in a semi-engaged state by a hydraulic pressure controller so that the center differential mechanism A can be placed in state in which it is not fully locked.

Let us now describe front-wheel drive shaft torque measurement, namely drive shaft torsion angle measurement. Rotation of the right side gear 44 of the front differential mechanism B is transmitted to the third hollow shaft 46 and, at the same time, to the rod 54 press-fitted into the third hollow shaft 46 at a base end portion. As shown in FIG. 4, the third hollow shaft 46 drives the right front-wheel drive shaft 49 via the fourth hollow shaft 47, which has the slitted disk 59 affixed thereto, and the shaft 48. Meanwhile, the rod 54 drives solely the slitted disk 58 via the rod 55 and cylinder body 57 and rotates freely in an unloaded state. It should be noted that the disks 58, 59 are provided with slits of the kind shown in FIGS. 1 and 2.

Accordingly, in the unloaded state where the right front wheel is floating free, the slitted disks 58, 59 rotate in synchronism. When a load acts upon the right front wheel, however, the third hollow shaft 46 twists. As a result, the rotational phase of the slitted disk 59 lags behind that of the slitted disk 58 so that relative rotation develops between the two. As mentioned above, the disks 58, 59 are provided with the slits that intersect when viewed along their central axes, with the position of the point of intersection changing in dependence upon relative rotation of the disks. Also, the light-emitting elements $61_1$–$61_6$ are arranged at positions opposing the light-receiving elements $62_1$–$62_6$, with the disks 58, 59 being interposed therebetween. When the point of intersection of the slits crosses the opposing rows of light-emitting and light-receiving elements due to rotation of the disks, the relative turning angle can be measured on the basis of which of the light-receiving elements $62_1$–$62_6$ is receiving light. Since an output signal is obtained from a light-receiving element once per revolution of the disks, rotating speed can also be detected from the output signal. In this detection operation, the pick-up mechanism 60 is adapted to block out ambient light completely so that it will not be detected by the light-receiving elements. Accurate measurement of the relative turing angle between the two disks is performed based on outputs thus obtained from the light-receiving elements. This enables measurement of the torsion angle of the third hollow shaft, fourth hollow shaft and the like, namely the load torque of the right front-wheel drive shaft.

In the above embodiment, the third hollow shaft 46 is for front-wheel drive. However, an opposite arrangement can be adopted in which the rod 54 is used for front-wheel drive and the slitted disk 58 is rotated by the third hollow shaft 46.

Figure 5:
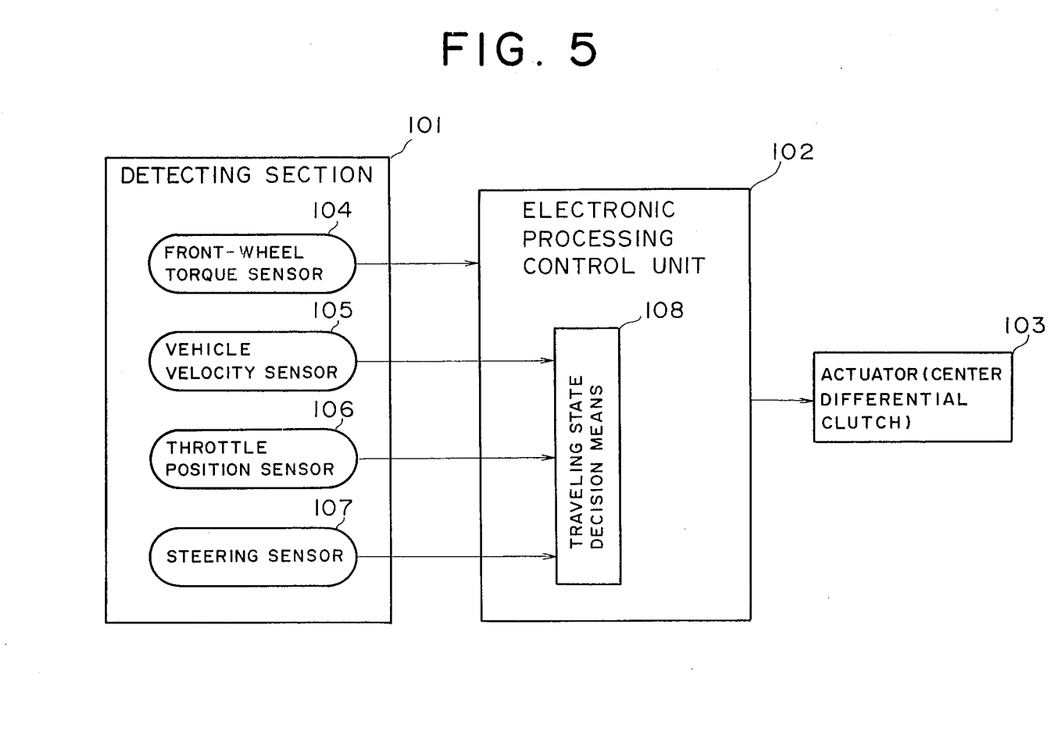
FIG. 5 is a block diagram illustrating an embodiment of a control system in a four-wheel drive vehicle control apparatus according to the present invention.

FIG. 5 is a block diagram of a control apparatus for engaging and releasing the clutch 33 for the center differential. The control apparatus comprises a detecting section 101, an electronic processing control unit 102, and an actuator 103. The detecting section 101 includes a front wheel torque sensor 104 arranged at an appropriate location of the front-wheel drive shaft, a vehicle velocity sensor 105, a throttle position sensor 106, and a steering sensor 107. The control unit 102 includes a vehicle traveling state decision mean 108. An output signal from the front wheel torque sensor 104 is processed within the electronic processing control unit 102, which outputs a signal for controlling the actuator 103. As the occasion demands, the decision means 108 judges the traveling state of the vehicle based on output signals from the vehicle velocity sensor 105, throttle position sensor 106 and steering sensor 107.

Figure 6:
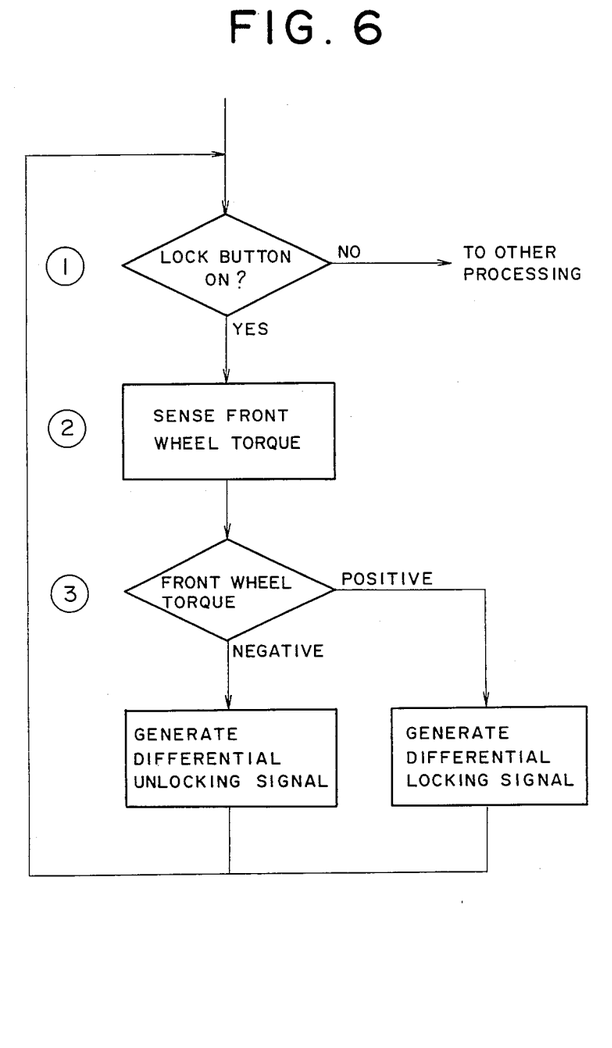
FIG. 6 is a flowchart useful in describing an embodiment of processing executed by an electronic processing control unit in the arrangement of FIG. 5.

An embodiment of the present invention will now be described with reference to the flowchart of FIG. 6.

(1) It is determined whether a lock button has been placed in the ON state. The lock button is for engaging the center differential clutch 53 to lock the center differential mechanism A. If a NO answer is received at this step, other processing is executed. If the answer is YES, the following processing is executed.

(2) The front-wheel torque is sensed by the front wheel sensor 104.

(3) If the front wheel torque is positive, then the control unit 102 outputs a signal which engages the center differential clutch 33 to lock the center differential mechanism A. If the front wheel torque is negative, on the other hand, the control unit 102 outputs a signal which releases the center differential clutch 53 to lock the center differential mechanism A.

(4) The steps (1) through (3) are repeated.

Figure 7:
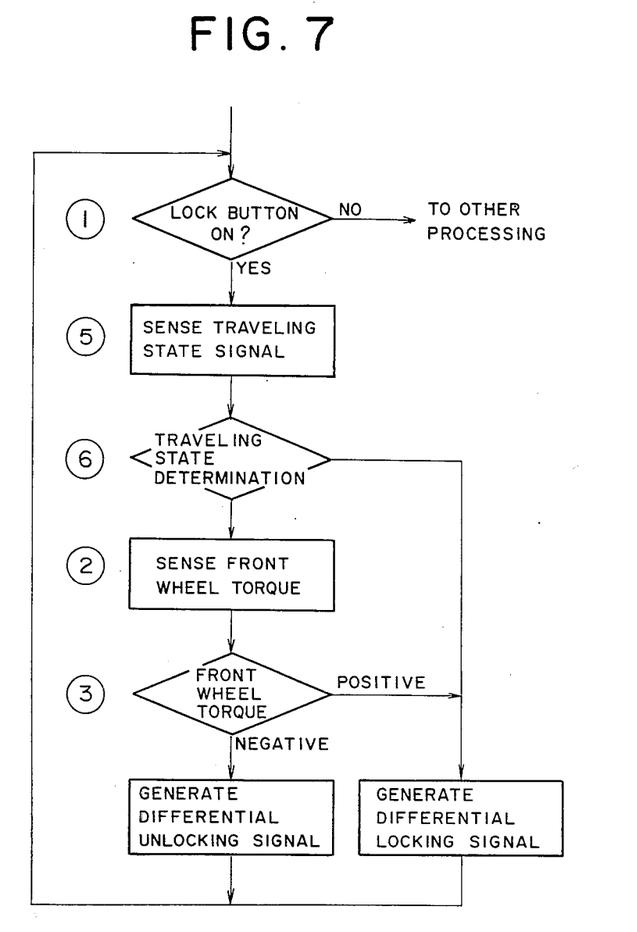
FIG. 7 is a flowchart useful in describing another embodiment of processing executed by an electronic processing control unit in the arrangement of FIG. 5.

Let us now describe another embodiment of processing indicated by the flowchart of FIG. 7. This embodiment differs from that of FIG. 6 in that the following process steps are inserted between the aforementioned steps (1) and (2):

(5) Signals indicative of the traveling state of the vehicle are sensed. This entails sensing signals indicative of vehicle velocity, throttle opening and steering angle from the velocity sensor 105, throttle position sensor 106 and steering sensor 107, respectively.

(6) The traveling state decision means 108 renders a decision on what the traveling state of the vehicle is. More specifically, in a case where the vehicle velocity is less than a fixed value, throttle opening is greater than a fixed value and steering angle is greater than a fixed value, then the program proceeds to the steps (2) and (3) described above. In all other cases the signal for locking the center differential mechanism A is outputted. In other words, the center differential mechanism A will be released from the locked state if the front wheel torque is negative under a condition where the vehicle velocity is low, the engine is being driven (i.e. when engine braking is not in effect) or the degree of cornering is small. An arrangement may be adopted in which the determination of the vehicle traveling state is made by selecting any one of the above conditions, namely vehicle velocity, throttle opening and steering angle, or by combining these conditions.

Still another embodiment of processing indicated by the flowchart of FIG. 7 will now be described. In the embodiments of FIGS. 6 and 7, the decision to lock or not is made on the basis of whether the front wheel torque is negative or positive. In the present embodiment, however, the decision is rendered based on a comparison between a torque signal and throttle opening, steering angle and vehicle velocity. This will now be described in steps (7) through (10) hereinbelow.

Figure 8:
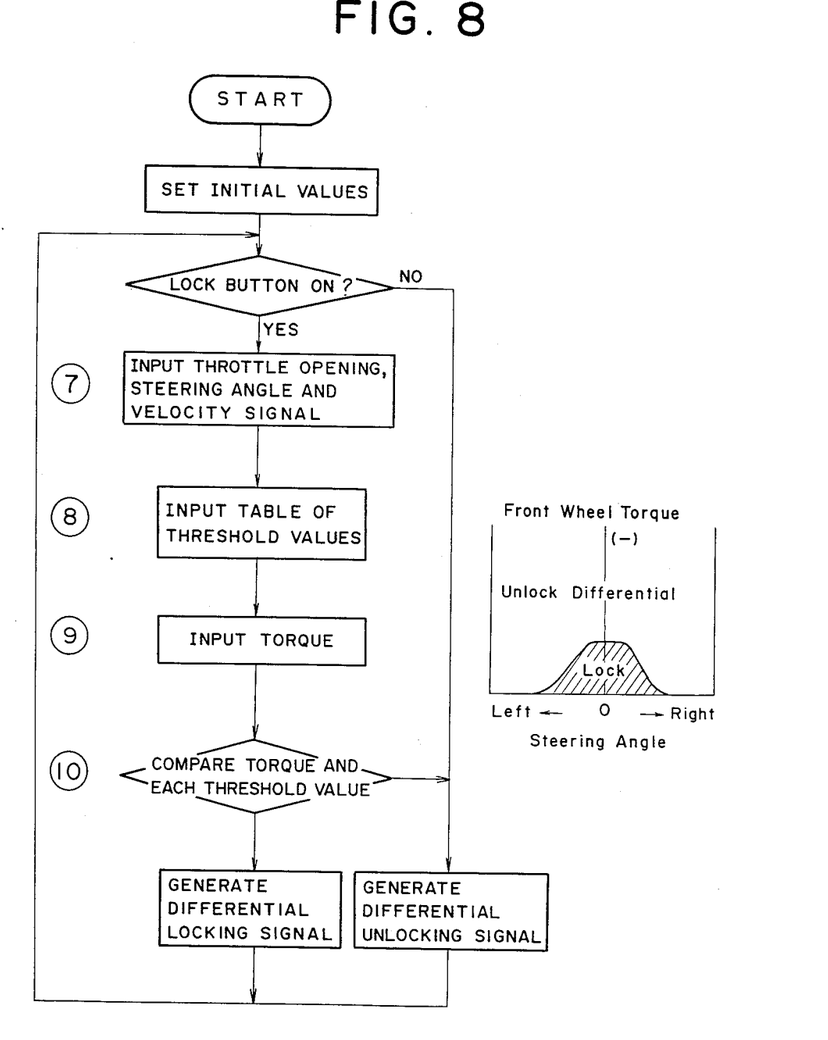
FIG. 8 is a flowchart useful in describing still another embodiment of processing executed by an electronic processing control unit in the arrangement of FIG. 5.

(7) Signals indicative of vehicle velocity, throttle opening and steering angle are applied to the control unit 102 from the sensors 105, 106, 107, respectively.

(8) A table of threshold values is inputted to the control unit 102. The threshold values determine regions for locking and unlocking the center differential mechanism in accordance with a relationship between front wheel torque and throttle opening, steering angle and vehicle velocity. For instance, taking steering angle as an example, regions for locking and unlocking the center differential mechanism based on left and right steering angles and the magnitude of the torque are prepared in advance and inputted to the control unit 102.

(9) A signal indicative of the front wheel torque is inputted to the control unit 102 from the front-wheel torque sensor 104.

(10) The torque signal is applied to the table of threshold values and a decision is rendered as to whether the torque signal indicates the region for locking or unlocking the center differential mechanism. The differential locking or unlocking signal is generated in accordance with the decision rendered.

It goes without saying that the invention is not limited to the above-described embodiments but can be modified in various ways. For example, though the center differential clutch 33 is released when the front wheel torque is negative in the foregoing embodiments, it is possible to adopt an arrangement in which the restraint on the differential is reduced by not fully disengaging the clutch. In other words, the clutch can be placed in a semi-engaged state.

Further, in the foregoing embodiments, a decision is made as to whether the lock button for locking the center differential mechanism is in the on state. However, an arrangement can be adopted in which this step is deleted and, instead, the traveling state of the vehicle and the front wheel torque are discriminated at all times during vehicle travel.

What is claimed is:

1. In a four-wheel drive vehicle having a center differential mechanism which allows a difference in rotating speed between front and rear wheels so as to absorb a difference in turning radius developed between the front and rear wheels when the vehicle is cornering, and a center differential clutch for restraining differential action of the center differential mechanism, a control apparatus comprising:

front-wheel torque sensing means provided on a front-wheel drive shaft for sensing the front-wheel torque, and wherein said front-wheel torque sensing means comprises:

(a) first and second opposing disks each having a continuous slit, said slits appearing to intersect each other when viewed along the common central axis of said disks, and (b) light-emitting elements and light-receiving elements arranged to oppose each other with said first and second disks interposed therebetween; and means for automatically actuating said center differential clutch, thereby reducing or removing the restraint on the differential action of said center differential mechanism, in a case where said front-wheel torque sensing means senses that a negative front-wheel torque is generated while the vehicle is traveling with the differential action of said center differential mechanism restrained.

2. The control apparatus according to claim 1, wherein said center differential mechanism has the restraint on the differential action thereof reduced or removed below a predetermined vehicle velocity.

3. The control apparatus according to claim 1 or 2, wherein said center differential mechanism has the restraint on the differential action thereof reduced or removed above a predetermined throttle opening.

4. The control apparatus according to claim 1 or 2, wherein said center differential mechanism has the restraint on the differential action thereof reduced or removed above a predetermined steering angle.

5. The control apparatus according to claim 1, wherein said first disk is rotatively driven by a first shaft for wheel drive driven by a side gear of said center differential mechanism, and said second disk is rotatively driven by a second shaft for wheel drive driven by said side gear.

6. The control apparatus according to claim 5, wherein said first shaft is a hollow cylindrical body and said second shaft is a rod extending through the interior of said first shaft.

7. The control apparatus according to claim 6, wherein said rod is press-fitted into a part of the hollow portion of said first shaft.

8. The optical rotary encoder according to claim 6 or 7, wherein the said second disk rotatively driven by said second shaft is driven via a rod fitted on said shaft and extending through a window provided in a side wall portion of a hollow shaft coupled to said first shaft.

9. The optical rotary encoder according to claim 5, wherein said second shaft is a hollow cylindrical body and said first shaft extends through the interior of said second shaft.

10. In a four-wheel drive vehicle wherein the power of an engine is constantly transmitted to both the front and rear wheels and having a center differential mechanism which allows a difference in rotating speed between the front and rear wheels for absorbing a difference in turning radius developed between the front and rear wheels when the vehicle is operating through a corner, and a center differential clutch for restraining differential action of the center differential mechanism, a control apparatus comprising:

a first sensor means for detecting the throttle opening of the engine;

a second sensor means for detecting a vehicle velocity;

a third sensor means for detecting a front wheel steering angle;

a fourth sensor means for detecting a torque of a front-wheel drive shaft; and electronic control means for actuating said center differential clutch by determining the traveling state of the vehicle on the basis of signals supplied from said first, second, third and fourth sensor means, wherein said front-wheel drive shaft has a torque which when abruptly reduced to a negative value under at least one of the following conditions:

(a) the vehicle velocity is below a predetermined level, (b) the throttle opening is greater than a predetermined degree, and (c) the steering angle is greater than a predetermined degree, said center differential clutch is automatically actuated for reducing or removing the restraint on the differential action of said center differential mechanism.

11. The control apparatus according to claim 10, further comprising memory means for storing a table of threshold values for determining regions wherein said center differential mechanism is locked or unlocked dependent on values representing the vehicle velocity, the throttle opening, the steering angle and the torque of said front-wheel drive shaft.

12. The control apparatus according to claim 10, wherein said fourth sensor means comprises:

first and second opposing disks each having a continuous slit, said slits appearing to intersect each other when viewed along a common central axis of said disks, and light-emitting elements and light-receiving elements arranged to oppose each other with said first and second disks interposed therebetween.

13. The control apparatus according to claim 10, wherein said first disk is rotatively driven by a first shaft for wheel drive driven by a side gear of said center differential mechanism, and wherein said second disk is rotatively driven by a second shaft for wheel drive driven by said side gear.

14. The control apparatus according to claim 13, wherein said first shaft is a hollow cylindrical body and said second shaft is a rod extending through the interior of said first shaft.

15. The control apparatus according to claim 14, wherein said rod is press-fitted into a part of the hollow portion of said first shaft.

16. The control apparatus according to claim 14, wherein said second disk rotatively driven by said second shaft is driven via a rod fitted on said second shaft and extending through a window provided in a side wall portion of a hollow shaft coupled to said first shaft.

17. The control apparatus according to claim 13, wherein said second shaft is a hollow cylindrical body and said first shaft extends through the interior of said second shaft.

* * * * *